United States Patent [19]

Budrose

[11] 3,946,156

[45] Mar. 23, 1976

[54] ADAPTER FOR RECORDING-REPRODUCING MACHINE

[76] Inventor: Charles R. Budrose, Box 1057, Saugus, Mass. 01906

[22] Filed: Oct. 29, 1974

[21] Appl. No.: 518,261

[52] U.S. Cl. ............................... 179/1 AT; 360/137
[51] Int. Cl.² ....................................... G11B 31/00
[58] Field of Search............ 179/2 E, 1 AT, 100.11; 360/88, 137

[56] References Cited
UNITED STATES PATENTS

| | | |
|---|---|---|
| 3,305,638 | 2/1967 | Teachout............................ 179/1 A |
| 3,582,965 | 6/1971 | DeMetrick..................... 179/100.11 |
| 3,644,684 | 2/1972 | Tsuji............................. 179/100.2 Z |
| 3,700,826 | 10/1972 | O'Neal........................... 179/100.11 |

FOREIGN PATENTS OR APPLICATIONS 1,106,720  3/1968  United Kingdom............ 179/100.11

Primary Examiner—William C. Cooper
Assistant Examiner—Randall P. Myers
Attorney, Agent, or Firm—Wolf, Greenfield & Sacks

[57] ABSTRACT

The adapter is for insertion into a conventional recording-reproducing machine, is in the form of a tape cassette, and is for adapting the machine for use as part of a public address system. A microphone couples to the adapter and the adapter comprises amplifier means for amplifying the audio signal and transducer means for coupling the amplified audio signal to the conventional transducer head of the machine.

11 Claims, 3 Drawing Figures

U.S. Patent   March 23, 1976   3,946,156
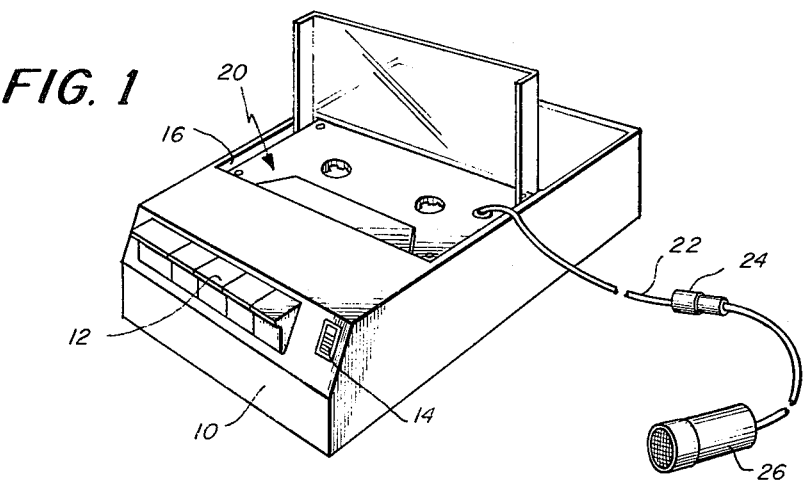
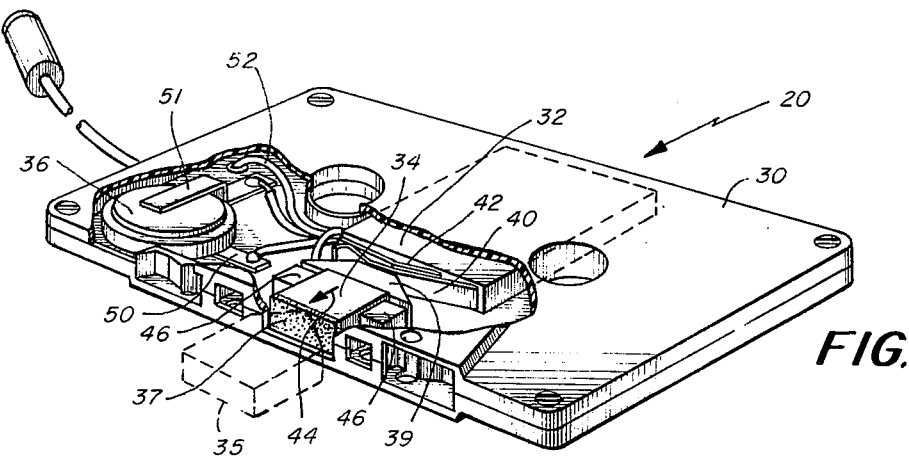
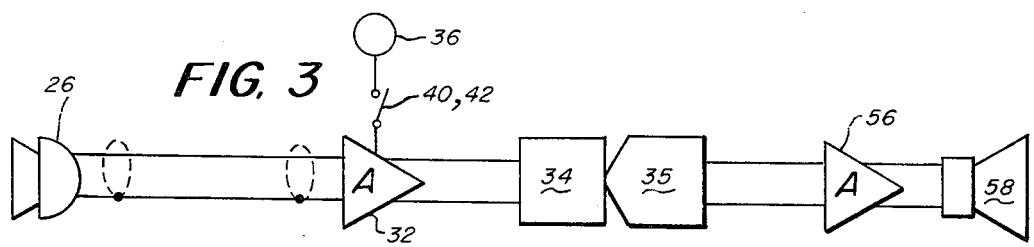

3,946,156

ADAPTER FOR RECORDING-REPRODUCING MACHINE

BACKGROUND OF THE INVENTION

The present invention relates, in general, to an adapter for a recording-reproducing machine. More particularly, this invention relates to an adapter that is in the form of a tape cassette and that can be inserted into the machine for permitting the machine to be operated as part of a public address system.

There are many tape recorders that use tape cassettes presently in use. Some of the more expensive machines have the capability of being used as a small public address system by providing proper modifications within the machine itself. However, most of the machines that are sold nowadays do not have this capability.

Accordingly, one object of the present invention is to provide an adapter for a conventional tape recorder that permits the recorder to be used as a public address system.

Another object of the present invention is to provide an adapter as set forth in the preceding object and that is in the form of a tape cassette to which is coupled a microphone.

A further object of the present invention is to provide an adapter for a tape recorder as set forth in the preceding objects and wherein the machine need not be modified for use of this adapter.

SUMMARY OF THE INVENTION

To accomplish the foregoing and other objects of this invention, there is provided a device for use with an audio recording-reproducing machine. The machine itself, includes a receiving station for a cassette, a transducer head and usually a switch array of control buttons. The device of the present invention is for enabling the machine to operate as part of a public address system. The device comprises a housing which is at least partially in the form of a cassette and fits into the cassette receiving station of the machine. Means are provided associated with the housing for receiving an audio input signal which may come from a microphone or other input device. Normally, a lead extends from the housing and terminates in a jack into which may be plugged a microphone or other input device. Within the housing there is an amplifying means and a transducer means. The transducer means is in juxtaposition to the transducer head of the machine. The audio signals coupled to the device are amplified by the amplifier means and coupled to the transducer means. The transducer means couples the signals to the transducer head of the machine where they may be further amplified and the output audio signal is normally heard through the speaker of the machine.

In the preferred embodiment that is disclosed herein the housing also contains a power source which may be in the form of a small battery and switch means responsive to the cassette being inserted into the machine for coupling power to the amplifier means. When the cassette is removed from the machine then the switch means opens and power is terminated to the amplifier means.

BRIEF DESCRIPTION OF THE DRAWINGS

Numerous other objects, features and advantages of the invention will now become apparent upon a reading of the following detailed description taken in conjunction with the accompanying drawings, in which:

FIG. 1 is a perspective view of a typical tape recorder having the adapter of the present invention inserted therein;

FIG. 2 is a perspective view that is partially cut-a-way and showing the adapter of the present invention; and FIG. 3 is a circuit schematic diagram concerned with the present invention.

DETAILED DESCRIPTION

FIG. 1 shows a tape recorder 10 which may be of conventional design. The tape recorder includes a switch of button array 12, and an on-off switch 14 which may also be a switch that controls volume, and a well for receiving a conventional tape cassette. However, in FIG. 1, within the well 16 there is disposed the device 20 of the present invention which is in the form of a cassette so that it is readily accommodated by the well. A lead 22 extends from the device 20 and has a jack 24 attached to the opposite end thereof. FIG. 1 also shows the microphone 26 coupling into the jack 24. The microphone 26 can be used as an input device or other input devices could be used for coupling audio signals via the device 20 to the machine where the speakers (not shown) of the machine can be used as the audio output device. Thus, this arrangement can be used as a small public address system or the device can be used in a more general sense allowing an open well recorder to be used as a general utility amplifier.

In FIG. 1 the switch array 12 typically includes a record button, a playback button, a stop button and a forward button. In accordance with the present invention it is preferred that the machine be inserted into the playback mode when used with device 20. In this way the transducer head of the machine is conditioned to receive audio signals. Normally, when a tape cassette is in the machine, the signals are coupled from the tape itself. Alternatively, with the present invention, these signals are coupled from the transducer means of the adapter to the transducer head of the machine.

For a more thorough understanding of the operation of the device shown in FIG. 1, reference is now made to the perspective view of the device 20 shown in FIG. 2. The device 20 includes a housing 30 which is in the form of a tape cassette. However, in accordance with this invention there is no tape within the housing. The housing contains an amplifier 32, a transducer head 34, and a battery 36. The housing 30 is preferably a rectangular plastic housing and is shown in FIG. 2 as being partially cut-a-way to expose the components therein. The amplifier 32 may be a one or two stage transistor amplifier and may be of conventional design. The amplifier 32 is shown in FIG. 2 as being potted and has extending from one end and embedded therein a pair of phosphor bronze spring contacts 40 and 42. Spring contact 40 is normally biased or loaded in the direction of arrow 44 and when the housing 30 is not placed in the recorder the contacts 40 and 42 are open. In the position shown in FIG. 2 these contacts are closed because the device has been inserted into a recorder and the head 34 which is in juxtaposition to the head 35 has been moved rearwardly to cause the contacts 40 and 42 to close.

The transducer head 34 is preferably a radiating coil and is faced with a plastic separator 37 at one end and a contact actuator 39 at the other end. The actuator 39 has wings which extend outwardly from the body of the transducer 34. There are provided two stationary stops 46 which are connected to the cassette housing and limit the movement of the transducer 34 in the direction of arrow 44. These stops actually limit the position of the transducer head 34 when the cassette is not in the machine. As previously mentioned, when the cassette is placed in the machine, the separater 37 is urged against the stationary transducer head of the machine and the transducer head 34 is urged rearwardly so that the contacts 40 and 42 close. Preferably, the transducer 34, separater 37 and actuator 39 are constructed in a one piece structure and move slidingly toward and away from the contact 40.

In operation, the cassette is inserted into the well of the recorder and when the machine is inserted into the play mode, the head of the tape recorder moves into the cassette, comes in contact with the transducer head 34 pushing it in the direction opposite to the direction shown by arrow 44 and the contacts 40 and 42 close. The closure of the contacts 40 and 42 couples the power from the battery 36 to the amplifier 32.

FIG. 2 shows the battery 36 and the associated contacts 50 and 51 which couple from opposite sides of the battery. The battery 36 may be a conventional disc dry cell battery. The contacts 50 and 51 make a solid contact with the battery especially when the housing is in place and the two halfs of the cassette are screwed into place. FIG. 2 also shows a number of conductor wires which couple between the amplifier 32 and contacts 50 and 51. In FIG. 2 there is also shown an output lead 52 coupling from the amplifier and externally coupling to the lead 22, shown in FIG. 1.

For a more thorough understanding of the circuit connection of the device of the present invention, reference is now made to the schematic diagram shown in FIG. 3. In FIG. 3 like reference characters will be used as they apply to the components shown in FIGS. 1 and 2. FIG. 3 shows the microphone 26 coupling to amplifier 32. One of the leads from the microphone 26 is the signal lead and the other may be a ground shield, as shown. The amplifier 32 is powered from battery 36 by way of contacts 40–42 discussed in detail previously with reference to FIG. 2. The output from the amplifier couples to transducer head 34 and the signal is from there coupled to the machine transducer head 35. The remainder of the circuitry shown in FIG. 3 is also conventional machine circuitry including an amplifier 56 which may have a volume control associated therewith and a speaker 58.

Having described one embodiment for the device of the present invention, it should now become apparent to those skilled in the art that there can be made other embodiments and modifications of the one shown herein, all of which are contemplated as falling within the scope of the present invention. For example, the contacts 40 and 42 are shown as extending from the amplifier casing. Alternatively, these contacts could be supported by other means. Also, a different type of a battery could be used than the one shown herein.

What is claimed is:

1. A device for use with an audio recording-reproducing machining having means defining a cassette receiving station and a transducer head, said device for enabling said machine to operate as at least part of a public address system and comprising;

means defining a housing at least partially in the form of a cassette for fitting into said cassette receiving station,
    means associated with the housing for receiving an audio input signal which may come from a microphone or other input device,
    means disposed in the housing for amplifying the audio signal,
    a self-contained active source of DC power disposed in the housing,
    means for selectively coupling the source of DC power to the amplifier means,
    a transducer means disposed in the housing in juxtaposition to said transducer head of the machine,
    and means for coupling the amplified audio signal to the transducer means,
    said transducer means coupling the signal to the transducer head of the machine.

2. A device as set forth in claim 1 wherein said means for selectively coupling is entirely contained in the housing.

3. A device as set forth in claim 1 including means for slideably mounting the transducer means so that the transducer head is moved against the transducer means to occasion selective coupling of power.

4. A device for use with an audio recording-reproducing machine having means defining a cassette receiving station and a transducer head, said device for enabling said machine to operate as at least part of a public address system and comprising;

means defining a housing at least partially in the form of a cassette for fitting into said cassette receiving station,
    means associated with the housing for receiving an audio input signal which may come from a microphone or other input device,
    means disposed in the housing for amplifying the audio signal,
    a power source disposed in the housing and capable of providing power to the amplifier means,
    means responsive to the device being inserted in the machine and the machine being in the play mode for only then permitting coupling of power to the amplifier means,
    a transducer means disposed in the housing in juxtaposition to said transducer head of the machine,
    and means for coupling the amplified audio signal to the transducer means,
    said transducer means coupling the signal to the transducer head of the machine.

5. The device of claim 4 wherein the means for coupling power includes a set of contacts.

6. The device of claim 5 including means for slideably mounting said transducer means, one of said contacts normally biasing said transducer means toward the transducer head of the machine.

7. A device for use with an audio recording-reproducing machine having means defining a cassette receiving station and a transducer head, said device for enabling said machine to operate as at least part of a public address system and comprising;

means defining a housing at least partially in the form of a cassette for fitting into said cassette receiving station,
    means associated with the housing for receiving an audio input signal which may come from a microphone or other input device,
    means disposed in the housing for amplifying the audio signal,
    a power source disposed in the housing and capable of providing power to the amplifier means, means for selectively coupling the power source to the amplifier means, means for slideably mounting said transducer means whereby when the machine is in the play mode the transducer head of the machine urges against the transducer means to occasion selective coupling of power, a transducer means disposed in the housing in juxtaposition to said transducer head of the machine, and means for coupling the amplified audio signal to the transducer means, said transducer means coupling the signal to the transducer head of the machine.

8. The device of claim 7 wherein said means for selectively coupling includes a set of contacts and means supporting the contacts so that one of the contacts biases the transducer means toward the transducer head of the machine.

9. The device of claim 8 wherein said means for mounting includes stop means for limiting the movement of the transducer means in one direction.

10. The device of claim 9 wherein the transducer means includes a radiating coil and said amplifier means includes a transistor amplifier circuit that is potted and functions as a support for said contacts.

11. A device for use with an audio recording-reproducing machine having means defining a cassette receiving station and a transducer head, said device comprising;

means defining a housing at least partially in the form of a cassette for fitting into said cassette receiving station, means associated with the housing for receiving an audio input signal, means disposed in the housing for amplifying the audio signal, a self-contained active source of power disposed in the housing, a transducer means disposed in the housing in juxtaposition to said transducer head of the machine, means for coupling the amplified audio signal to the transducer means, and means responsive to movement of the transducer head toward the cassette for selectively coupling the power source to the amplifier means.

* * * * *